US012175735B2

(12) United States Patent
Lee

(10) Patent No.: US 12,175,735 B2
(45) Date of Patent: Dec. 24, 2024

(54) EMBEDDED SEMANTIC DIVISION NETWORK APPARATUS OPTIMIZED FOR MMA THAT CLASSIFIES PIXELS IN VEHICLE IMAGES

(71) Applicant: HYUNDAI MOBIS CO., LTD., Seoul (KR)

(72) Inventor: Jae Young Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 492 days.

(21) Appl. No.: 17/702,262

(22) Filed: Mar. 23, 2022

(65) Prior Publication Data

US 2022/0309775 A1    Sep. 29, 2022

(30) Foreign Application Priority Data

Mar. 23, 2021    (KR) ........................ 10-2021-0037609

(51) Int. Cl.
*G06V 10/82* (2022.01)
*G06V 10/46* (2022.01)
*G06V 10/70* (2022.01)
*G06V 10/764* (2022.01)
(Continued)

(52) U.S. Cl.
CPC .............. *G06V 10/82* (2022.01); *G06V 10/46* (2022.01); *G06V 10/764* (2022.01);
(Continued)

(58) Field of Classification Search
CPC ...... G06V 10/82; G06V 10/806; G06V 10/87; G06V 10/955; G06V 10/764; G06V 10/46;
(Continued)

(56) References Cited

U.S. PATENT DOCUMENTS 10,290,107 B1 *  5/2019  Casas ........................ G06T 7/11
10,740,626 B2    8/2020  Kang et al.
(Continued)

FOREIGN PATENT DOCUMENTS

EP             3387549 A1    10/2018
KR    10-2017-0126241 A     4/2019
(Continued)

OTHER PUBLICATIONS

Jaeyoung Lee, "Embedded Semantic Segmentation Network Optimized for Matrix Multiplication Accelerator", World Academy of Science, Engineering and Technology International Journal of Computer and Information Engineering vol. 14, 2020.

*Primary Examiner* — John Villecco
*Assistant Examiner* — Alejandro Hernandez
(74) *Attorney, Agent, or Firm* — NovoTechIP International PLLC

(57) ABSTRACT

Provided is an embedded semantic division network including a communication module configured to receive an image captured by a camera, a memory configured to store a semantic division network (MMANet)-based program for extracting a context of the captured image, and a processor extracts the context of the captured image by selecting a convolutional neural network (CNN) processing module or a depth-wise separable convolution (DSC) processing module according to a size of a activation map in each layer of the semantic division network that includes an encoder unit and a decoder unit including at least one of the CNN processing module and the DSC processing module that are connected from an upper layer to a lower layer and reduce features of an input image.

10 Claims, 9 Drawing Sheets

(51) Int. Cl.
*G06V 10/80* (2022.01)
*G06V 10/94* (2022.01)
*G06V 20/56* (2022.01)

(52) U.S. Cl.
CPC ............ *G06V 10/806* (2022.01); *G06V 10/87* (2022.01); *G06V 10/955* (2022.01); *G06V 20/56* (2022.01)

(58) Field of Classification Search
CPC ........ G06V 20/56; G06V 10/26; G06F 18/21; G06F 18/24
See application file for complete search history.

(56) References Cited

U.S. PATENT DOCUMENTS

| | | | |
|---|---|---|---|
| 10,885,433 B2* | 1/2021 | Song | G06N 3/04 |
| 2018/0307911 A1* | 10/2018 | Zohourian | H04N 23/90 |
| 2019/0147296 A1* | 5/2019 | Wang | G06F 18/2148 |
| | | | 382/157 |
| 2020/0082219 A1* | 3/2020 | Li | G01S 7/417 |
| 2020/0084427 A1* | 3/2020 | Sun | G06N 3/045 |
| 2020/0151492 A1* | 5/2020 | Chen | G06F 18/241 |
| 2020/0234447 A1* | 7/2020 | Karmatha | G06V 10/82 |
| 2020/0320748 A1* | 10/2020 | Levinshtein | G06T 7/12 |

FOREIGN PATENT DOCUMENTS

| | | |
|---|---|---|
| KR | 10-1970488 B1 | 4/2019 |
| KR | 10-2160224 B1 | 9/2020 |
| KR | 10-2191428 B1 | 12/2020 |

\* cited by examiner

EMBEDDED SEMANTIC DIVISION NETWORK APPARATUS OPTIMIZED FOR MMA THAT CLASSIFIES PIXELS IN VEHICLE IMAGES

CROSS-REFERENCE TO RELATED APPLICATIONS

This application claims priority to and the benefit of Korean Patent Application No. 10-2021-0037609, filed on Mar. 23, 2021, the disclosure of which is incorporated herein by reference in its entirety.

BACKGROUND

1. Technical Field

The present invention relates to an embedded semantic division network apparatus optimized for a matrix multiplication accelerator that classifies pixels in vehicle images.

2. Discussion of Related Art

Typical autonomous driving systems use sensors to recognize driving environments, determine states such as directions and speeds of vehicles, and control the states in real time. Autonomous vehicles require high reliability because the autonomous vehicles may endanger human life when malfunctioning. However, despite the development of a number of vehicle sensors such as radar, a camera, an ultrasonic sensor, and Light Detection And Ranging (Li-DAR), it is difficult to always provide high recognition performance in various driving environments changing by time and season. Therefore, most mass-produced vehicles are still in a driving support stage and have achieved level 3 (LV3) in which original equipment manufacturers (OEMs) are responsible for driving results only in a limited driving environment.

In order to overcome the reliability limit of the autonomous driving system, it is necessary to improve driving environment recognition performance. Among vehicle sensors, cameras are essential for the autonomous driving systems because the cameras are most similar to human recognition methods and may provide information such as lanes, signs, and traffic lights.

In particular, by using a deep learning algorithm that has recently developed rapidly, it is possible to provide recognition performance higher than the limit of classical recognition methods instead of using a large amount of computation. However, since the autonomous driving system is an automotive embedded system for real-time control, the autonomous driving system needs to satisfy the conditions of power consumption, semiconductor reliability, latency, throughput, and price, and thus, may not use a deep learning network with high complexity. In addition, since typical embedded networks are optimized for graphics processing unit (GPU) or advanced RISC machine (ARM) environments, the performance of the embedded networks is degraded in processors with simple hardware (HW) accelerators.

SUMMARY

The present invention is directed to providing an embedded semantic division network apparatus optimized for a matrix multiplication accelerator (MMA) as a basic embedded hardware accelerator that classifies pixels in vehicle images to improve the recognition performance of an autonomous driving system.

However, the problems to be solved by the present invention are not limited to the above problems, and other problems may exist.

According to an aspect of the present invention, an embedded semantic division network apparatus optimized for an MMA that classifies pixels in vehicle images includes: a communication module configured to receive an image captured by a camera; a memory configured to store a semantic division network (MMANet)-based program for extracting a context of the captured image; and a processor configured to execute the program stored in the memory. Here, the processor extracts the context of the captured image by selecting a convolutional neural network (CNN) processing module or a depth-wise separable convolution (DSC) processing module according to a size of an activation map in each layer of the semantic division network that includes an encoder unit and a decoder unit including at least one of the CNN processing module and the DSC processing module that are connected from an upper layer to a lower layer and reduce features of an input image as the processor executes the program.

The processor may receive feature information of an image output from the encoder unit through extended Atrous spatial pyramid pooling (ASPP) applied to a predetermined layer of the decoder unit, and extract feature information corresponding to the encoded image.

The extended ASPP may include a plurality of ASPPs to extract a high-quality context using a reconstructed shape without global average pooling paths, and the plurality of ASPPs may include a first ASPP applied to an upper layer in the predetermined layer and a second ASPP applied to a lower layer following the upper layer.

The second ASPP may be applied to a lowest layer among the layers of the semantic division network.

The second ASPP may include an input stage that includes a plurality of CNNs receiving the feature information output from the encoder unit and an extended path configured parallel with the plurality of CNNs, and an output stage that combines each output value by the input stage and inputs the combined input value to the CNN.

The extended path may include a CNN, DSCs for receiving an output of the CNN, and a bilinear interpolation unit for combining each output of the DSCs and bilinearly interpolating the combined output.

The first ASPP may include an input stage that includes a CNN for receiving feature information output from the second ASPP and a plurality of inverse DSCs (IDSCs) arranged in parallel with the CNN, and an output stage that combines each output value by the input stage and inputs the combined output value to the CNN.

The encoder unit may include a shape information transfer unit including one or more CNNs that are provided in a predetermined layer among the respective layers and transmit detailed shape information of images corresponding to each of the layers to the decoder unit.

The respective layers may include a first layer to a fourth layer, the encoder unit may include two L3 modules provided in the third layer that abstracts feature information output from a previous layer and an L4 module provided in the fourth layer, the L3 module may include a plurality of DSCs for receiving the feature information and having different dilations, a pointwise convolution unit for combining output values of the plurality of DSCs and receiving the combined output value, and a summer for summing the input feature information and an output value of the pointwise convolution unit, and the L4 module may include a plurality of CNN layers for receiving the feature information, and a summer for summing final output values from the plurality of CNN layers and the input feature information.

In the semantic division network, the maximum number of channels is limited to 64.

A computer program according to another aspect of the present invention for solving the above-described problems is combined with a computer as hardware to execute a program based on a semantic division network, and is stored in a computer-readable recording medium.

Other specific details of the present invention are included in the detailed description and drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Figure 1:
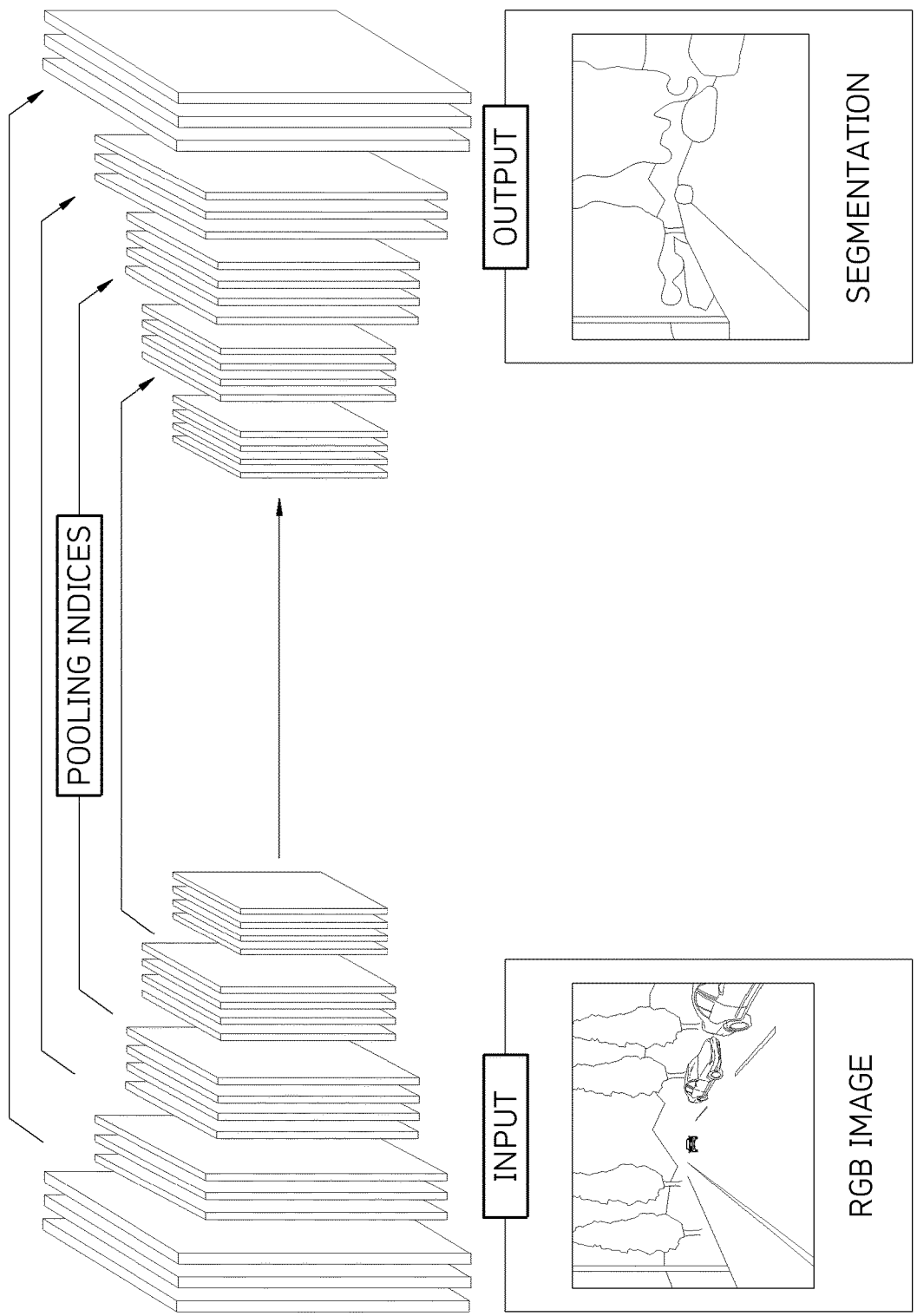
FIG. 1 is a diagram illustrating an example of a semantic division network.

Various advantages and features of the present invention and methods accomplishing them will become apparent from the following description of embodiments with reference to the accompanying drawings. However, the present invention is not limited to the embodiments disclosed herein, but may be implemented in various forms. The embodiments make contents of the present invention thorough and are provided so that those skilled in the art can easily understand the scope of the present invention. Therefore, the present invention will be defined by the scope of the appended claims.

Terms used in the present specification are for explaining the embodiments rather than limiting the present invention. Unless otherwise stated, a singular form includes a plural form in the present specification. Throughout this specification, the term "comprise" and/or "comprising" will be understood to imply the inclusion of stated constituents but not the exclusion of any other constituents. Like reference numerals refer to like components throughout the specification and "and/or" includes each of the components mentioned and includes all combinations thereof. Although "first," "second," and the like are used to describe various components, it goes without saying that these components are not limited by these terms. These terms are used only to distinguish one component from other components. Therefore, it goes without saying that the first component described below may be the second component within the technical scope of the present invention.

Unless defined otherwise, all terms (including technical and scientific terms) used in the present specification have the same meaning as meanings commonly understood by those skilled in the art to which the present invention pertains. In addition, terms defined in commonly used dictionary are not ideally or excessively interpreted unless explicitly defined otherwise.

The present invention relates to an embedded semantic division network apparatus 100 optimized for a matrix multiplication accelerator (MMA) that classifies pixels in vehicle images (hereinafter, embedded semantic division network apparatus).

Figure 2:
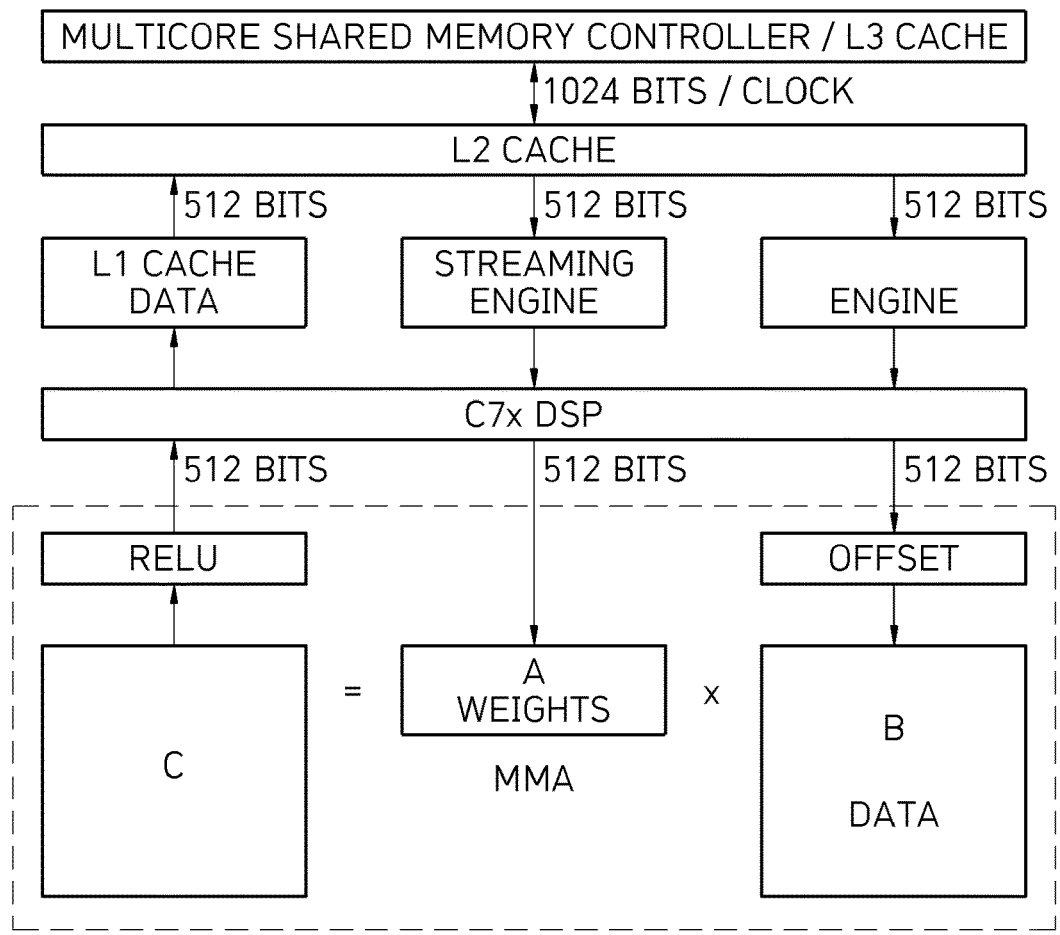
FIG. 2 is a diagram illustrating a structure of a TDA4V matrix multiplication accelerator (MMA) from TI Co.

FIG. 1 is a diagram illustrating an example of a semantic division network. FIG. 2 is a diagram illustrating a structure of a TDA4V MMA from TI Co.

The semantic division network is for classifying each pixel in an image. High classification accuracy may be obtained by using deep learning algorithms to improve the recognition performance of an autonomous driving system.

However, since the autonomous driving system is an automotive embedded system for real-time control, the autonomous driving system needs to satisfy the conditions of power consumption, semiconductor reliability, latency, throughput, and price, and thus, may not use a network with high complexity. In addition, since the existing deep learning network is optimized for a graphics processing unit (GPU) or advanced RISC machine (ARM) processor environment, there is a problem in that performance of the deep learning network is degraded in a processor with a simple hardware accelerator.

In order to solve this problem, an embodiment of the present invention provides an embedded semantic division network apparatus 100 optimized for an MMA as a basic embedded hardware accelerator that classifies pixels in vehicle images to improve the recognition performance of an autonomous driving system.

In particular, an embodiment of the present invention provides a semantic division network optimized for an MMA of a Texas Instruments Digital Signal Processor (TI DSP) as illustrated in FIG. 2. That is, the deep learning method according to the related art is optimized for a GPU capable of performing typical operations, and therefore, may not maximize the performance of the MMA, which is a simple hardware accelerator. However, when a method optimized for the MMA can be found, multiplication and addition (MAC) may be performed 4,096 times for one cycle, and thus, the performance of the MMA may be improved. The MMA may perform the following Equation 1 in one cycle.

$$[c_1 \; c_2 \; \ldots \; c_{64}][a_1 \; a_2 \; \ldots \; a_{64}] \times \begin{bmatrix} b_{1,1} & b_{1,2} & \ldots & b_{1,64} \\ b_{2,1} & b_{2,2} & \ldots & b_{2,64} \\ \vdots & \vdots & \ddots & \vdots \\ b_{64,1} & b_{64,2} & \ldots & b_{64,64} \end{bmatrix} \quad \text{[Equation 1]}$$

Figure 3:
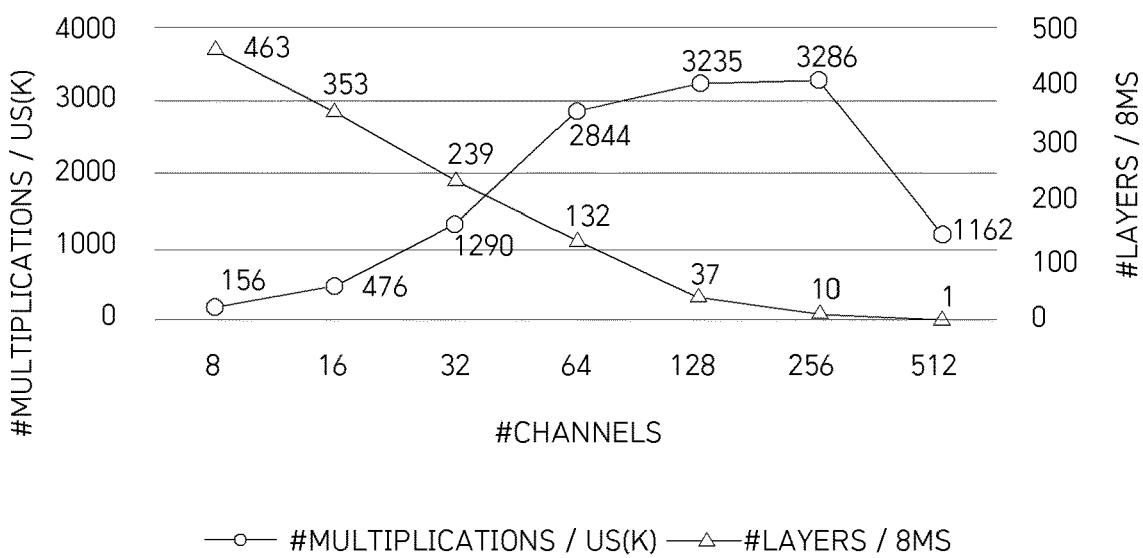
FIG. 3 is a diagram for describing the number of layers and multiplications according to the number of channels for optimizing the MMA.

FIG. 3 is a diagram for describing the number of layers and multiplications according to the number of channels for optimizing the MMA.

As illustrated in FIG. 3, the number of layers and the number of multiplications used in one layer vary according to the number of channels. The number of multiplications provided by one layer is directly connected to a level of abstraction (operation level) that the layer may provide. Therefore, when a layer capable of providing a large number of multiplications at the same time is used, recognition performance is also improved at the same processing speed.

An embodiment of the present invention is characterized in that the number of channels is limited in order to provide the maximum number of multiplications while satisfying the requirements for the number of layers. As an example, the limited number of channels may be 64.

The semantic division network 200 proposed in an embodiment of the present invention used the following three methods in order to optimize the network structure for an MMA operation of a TDA4V MID processor from TI Co., which is a vision processing unit (VIP) used in ADAS_VP and ADAS_PRK II controllers.

First, a path was configured to minimize access to a dual data rate (DDR) memory and to perform internal operations using only an L3 cache. Second, network expressive power was increased by selectively applying depth-wise separable convolution (DSC) according to a size of an activation map. Finally, a correct context was extracted using extended Atrous spatial pyramid pooling (ASPP). 5×5 and 7×7 convolution paths were added in order to stably operate ASPP with a large variation depending on location, and by using 2-stage ASPP, shape information was decoded using context information.

Meanwhile, an embodiment of the present invention is characterized in that it is applied to an autonomous driving system, but is not necessarily limited thereto. Since the autonomous driving system needs to recognize a 360° environment around a vehicle in real time, the semantic division network should satisfy the requirements according to Table 1 below.

TABLE 1

| Group | Specification | Value |
| --- | --- | --- |
| Requirement | Image size | 640, 480 |
|  | Camera | 6EA |
|  | FPS | 20 |
|  | Weight | 7,936 kB |
| Target | Processing time (85%) | 7.08 ms |
|  | Weight size (60%) | 4761 kB |
|  | # Layers | >150 |

Hereinafter, the embedded semantic division network apparatus 100 according to the embodiment of the present invention will be described with reference to FIGS. 4 to 10.

Figure 4:
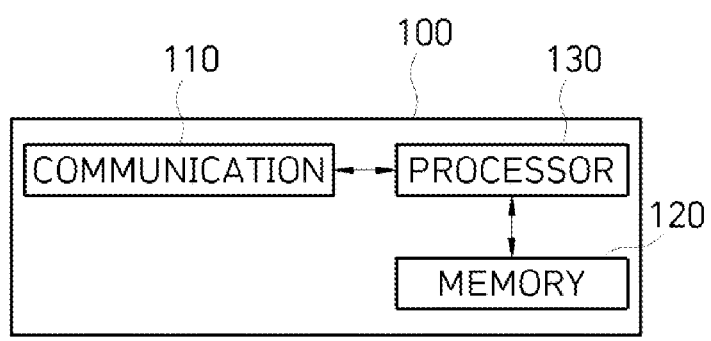
FIG. 4 is a block diagram of an embedded semantic division network apparatus according to an embodiment of the present invention.
Figure 5:
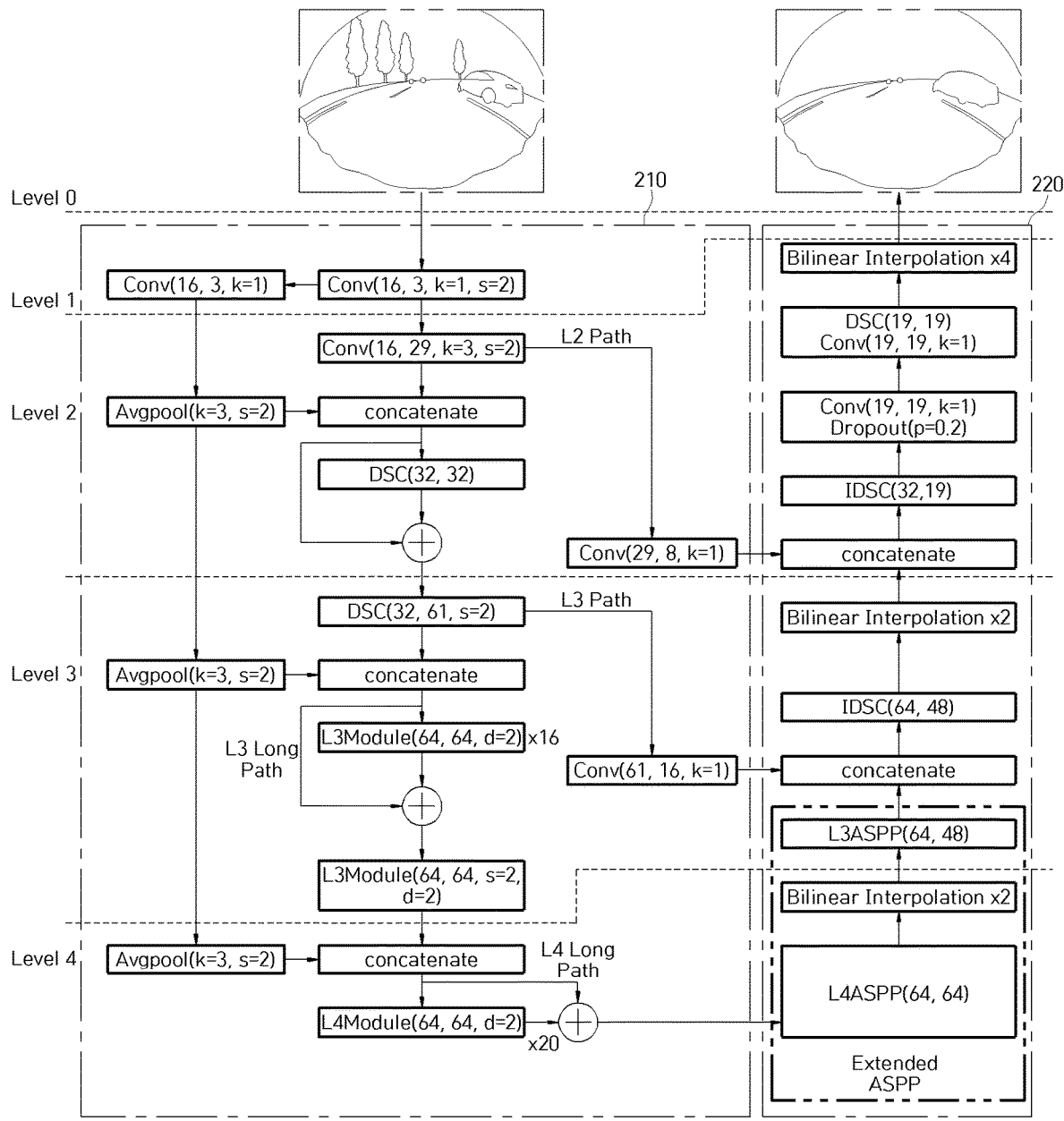
FIG. 5 is a diagram for describing the embedded semantic division network apparatus according to the embodiment of the present invention.

FIG. 4 is a block diagram of the embedded semantic division network apparatus 100 according to the embodiment of the present invention. FIG. 5 is a diagram for describing the embedded semantic division network apparatus 100 according to the embodiment of the present invention.

The embedded semantic division network apparatus 100 according to the embodiment of the present invention includes a communication module 110, a memory 120, and a processor 130.

The communication module 110 receives an image captured by a camera.

A semantic division network (MMANet)-based program for extracting the context of the captured image is stored in the memory 120, and the processor 130 executes the program stored in the memory.

The processor 130 extracts the context of the captured image by selecting a convolutional neural network (CNN) processing module or a DSC processing module according to the size of the activation map in each layer of the semantic division network 200.

Referring to FIG. 5, the semantic division network 200 is connected from an upper layer to a lower layer, and includes an encoder unit 210 and a decoder unit 220 that include at least one of the CNN and DSC processing modules for reducing features of the input image. Respective layers of the semantic division network 200 in an embodiment of the present invention includes a first layer (Level 1) as the upper layer to the fourth layer (Level 4) as the lower layer, and the maximum number of channels in the third layer and the fourth layer is limited to 64. A $0^{th}$ layer (Level 0) means a layer in which an original image is present.

In this case, as the levels of each layer of the encoder unit 210 and the decoder unit 220 increase, horizontal and vertical sizes of the feature information are reduced by half. For example, a network with all levels of 0 may have more detailed information, but a large amount of computation since the size of the feature information does not decrease. In addition, when up to a fifth layer level is present, the size of the feature information is excessively reduced and the amount of information loss increases, so compensation in the decoder unit 220 may be difficult.

In an embodiment, the encoder unit 210 may include one or more shape information transfer units that are constituted by a CNN, are provided in a predetermined layer among respective layers, and transfer detailed shape information of images corresponding to each layer to the decoder unit 220.

Referring to FIG. 5, the encoder unit 210 includes an L2 path and an L3 path in the second layer (Level 2) and the third layer (Level 3), respectively, and may transfer, to the decoder unit 220, detailed shape information of images corresponding to the second layer and the third layer through each shape information transfer unit (Conv(29,8, k=1), Conv(61,16, k=1)), which is constituted by a CNN, using each path. According to an embodiment of the present invention, the detailed shape information of the image is transmitted to the decoder unit 220 through the L2 path and the L3 path, so the decoder unit 220 may perform semantic division using the abstraction (classification information) and the shape information.

As an embodiment, the encoder unit 210 may include two L3 modules provided in the third layer for abstracting the feature information output from the previous layer and an L4 module provided in the fourth layer.

Figure 6:
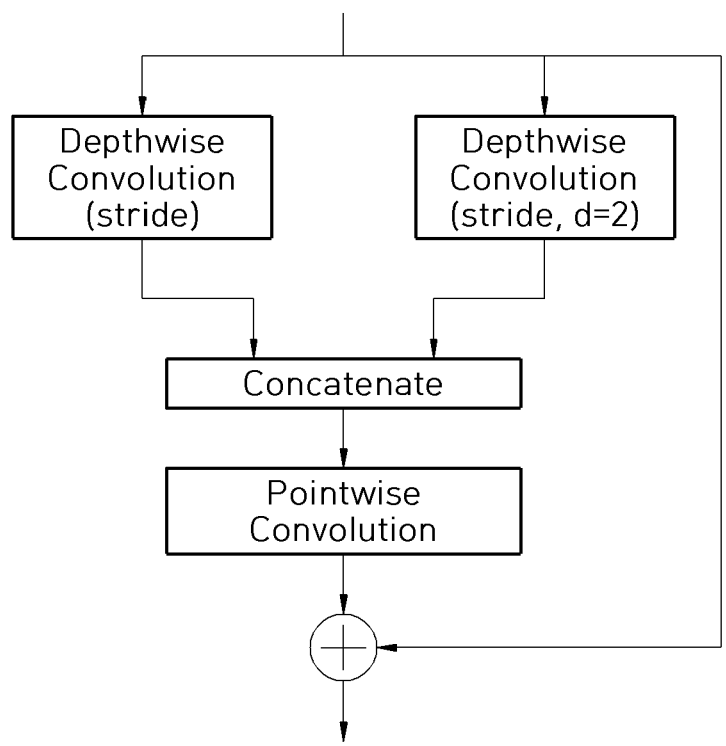
FIG. 6 is a diagram for describing an L3 module.
Figure 7:
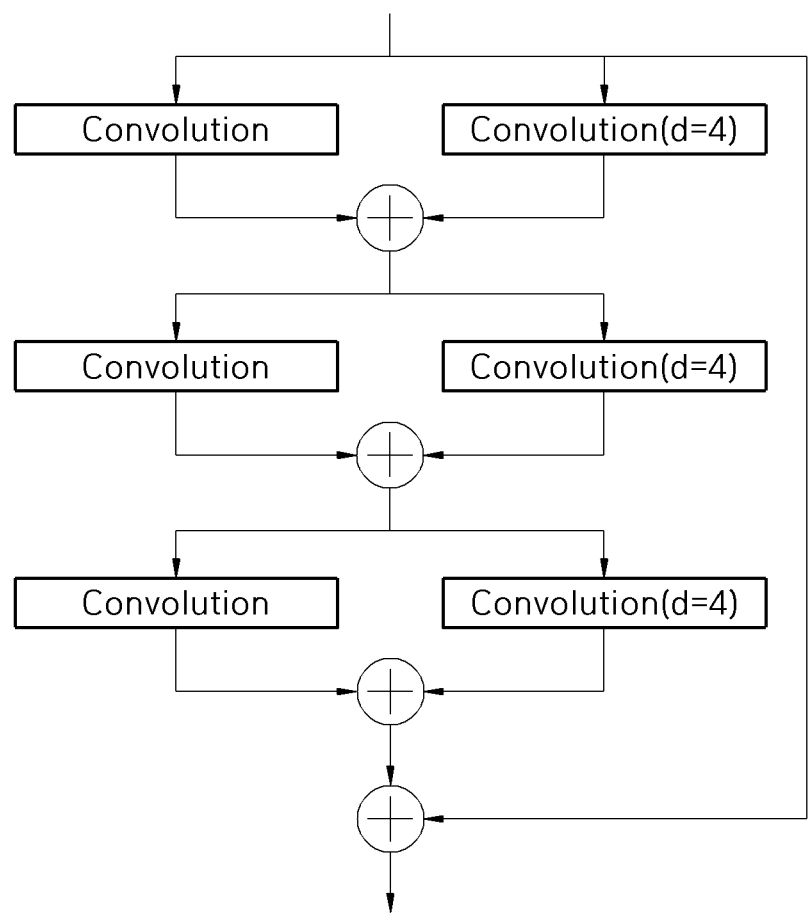
FIG. 7 is a diagram for describing an L4 module.

FIG. 6 is a diagram for describing the L3 module. FIG. 7 is a diagram for describing the L4 module.

The existing deep learning network repeatedly uses a single module, but an embodiment of the present invention is characterized by using a module structure optimized according to the layer level to improve recognition performance.

Since both of the L3 module and the L4 module are provided in an intermediate middle layer of the semantic division network 200, both of the input value and the output value become the feature information. However, the L3 module and the L4 module provided in an embodiment of the present invention are characterized in that the levels of abstraction of their output values are higher than those of other CNN and DSC processing modules. In the state in which both of the L3 and L4 modules have a wider field of view (FoV) than general convolution (applies dilation=2 and 4) and are configured so that wide feature information may be viewed, the L3 and L4 modules are structured in such a way that the amount of computation is minimized according to the level. In this case, the third layer includes two L3 modules to have a size of feature information corresponding to the fourth layer by applying stride=2.

The L3 module provided in the third layer includes a plurality of DSCs for receiving the feature information and having different dilations, a pointwise convolution unit that combines output values of the plurality of DSCs and receives the combined output value, and a summer for summing the input feature information and an output value of the pointwise convolution unit. Since the L3 module generates the output values by taking weights from the convolution results having different dilations, an optimal weight is set in the learning process.

The L4 module provided in the fourth layer includes a plurality of CNN layers for receiving the feature information, and a summer for summing final output values from the plurality of CNN layers and the input feature information. This L4 module sums widely (dilation=4) extracted feature information and narrowly extracted feature information without weight in order to widen the FoV that processes the feature information in each parallel path. Therefore, in the learning process, the size of the feature information according to the location is determined by being influenced by the feature information distributed in a near distance (general convolution d=1) and a far distance (d=4).

In addition, an L3 long path and an L4 long path are provided in the third layer and the fourth layer, respectively. The long path allows a plurality of modules to be conceptualized as a single module, and adds the detailed shape information to abstraction information that is strengthened as the layer deepens. Each of these paths allows the L3 module and the L4 module to perform a residual operation, and also smooths a flow of gradients in the learning process.

Figure 8A:
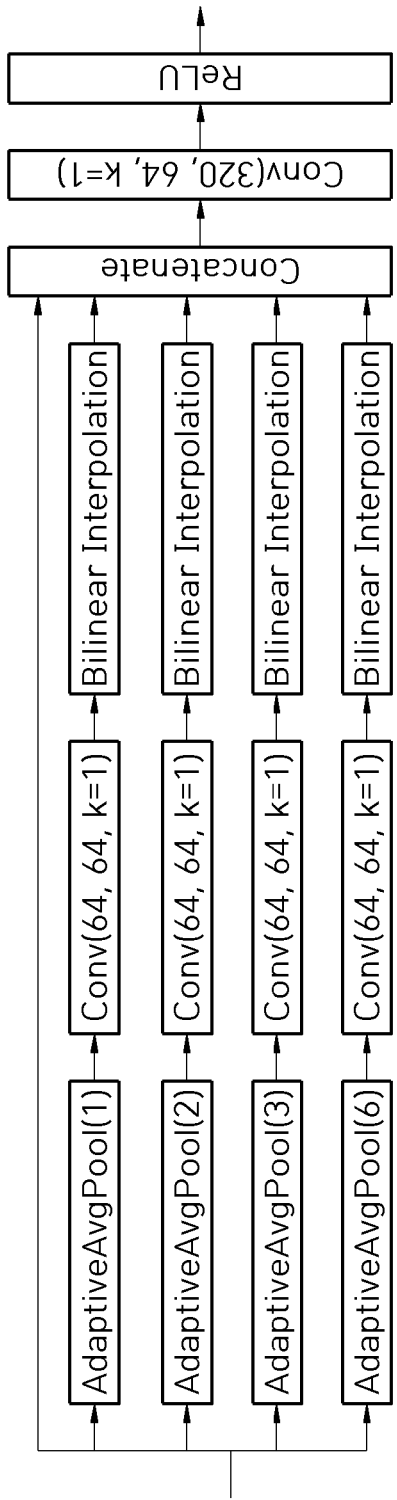
FIGS. 8A and 8B shows diagrams for describing pyramid pooling and Atrous spatial pyramid pooling (ASPP) according to the related art.
Figure 8B:
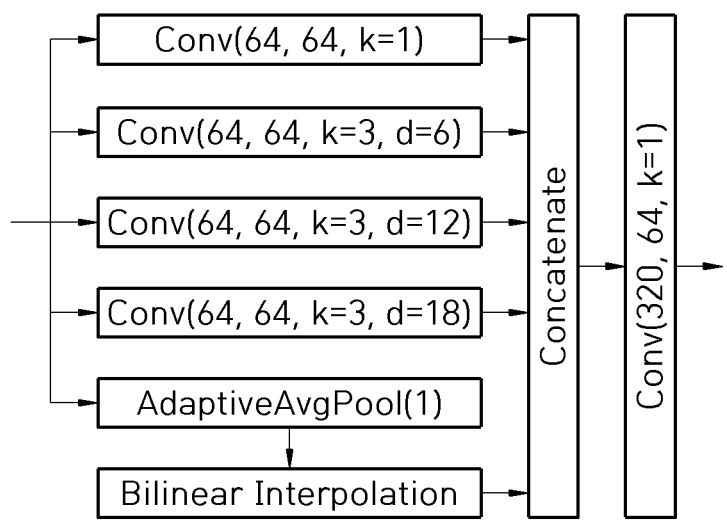
Figure 9:
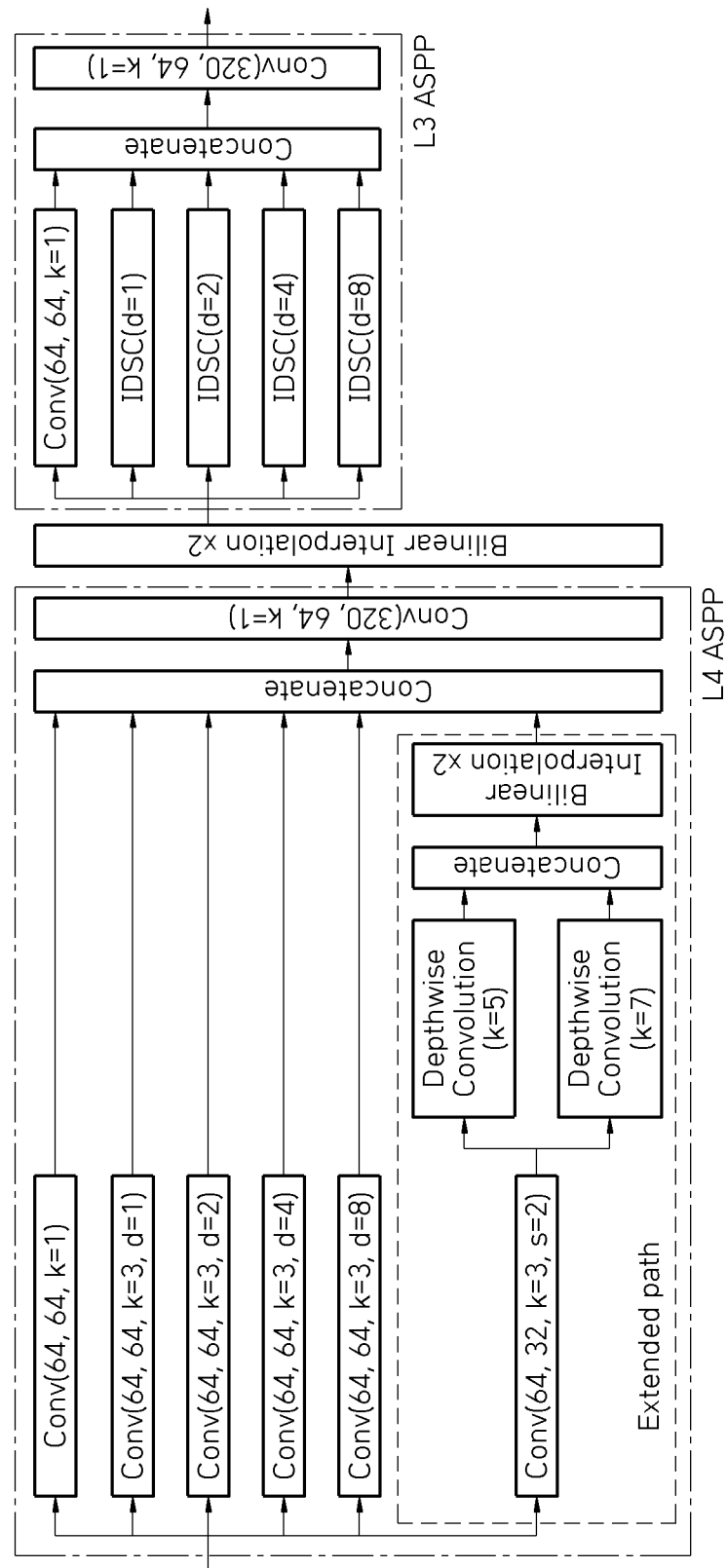
FIG. 9 is a diagram for describing extended ASPP according to an embodiment of the present invention.

FIGS. 8A and 8B shows diagrams for describing the pyramid pooling and ASPP according to the related art. FIG. 9 is a diagram for describing the extended ASPP according to an embodiment of the present invention.

The pyramid pooling (see FIG. 8A) has the advantage of being insensitive to high frequency, but has a disadvantage in terms of performance speed because the overall average operation used is not a matrix operation. In addition, the typical ASPP (see FIG. 8B) according to the related art uses the convolution operation to view a wide FoV like the pyramid pooling, but has a disadvantage of being sensitive to high-frequency components.

In order to solve this problem, the extended ASPP in the present invention may view the wide FoV like the pyramid pooling, and has characteristics sensitive to the high-frequency components by using the extended path.

Specifically, the processor 130 receives the feature information of the image output from the encoder unit 210 through the extended ASPP applied to a predetermined layer of the decoder unit 220, and extracts the feature information corresponding to the encoded image. That is, the input and output values of the extended ASPP become the feature information, and since the FoV is wide due to the characteristics of the extended ASPP, the classification results using the shape information around each pixel are output as well.

In an embodiment, the extended ASPP includes a plurality of ASPPs to extract a high-quality context using a reconstructed shape without global average pooling paths. In this case, the plurality of ASPPs include a first ASPP applied to the upper layer in the predetermined layer and a second ASPP applied to a lower layer consecutive to the upper layer. Here, the second ASPP is applied to the fourth layer, which is the lowest layer among the layers of the semantic division network 200, and the first ASPP is applied to the third layer following the fourth layer.

The second ASPP includes an input stage that includes a plurality of CNNs for receiving the feature information output from the encoder unit 210 and an extended path configured parallel with the plurality of CNNs, and an output stage that combines each output value by the input stage and inputs the combined input value to the CNN. In addition, the extended path includes a CNN, DSCs for receiving the output of the CNN, and a bilinear interpolation unit (bilinear interpolation×2) that combines each output of the DSCs and bilinearly interpolates the combined output. Here, the bilinear interpolation unit serves to multiply the horizontal and vertical sizes of the input features so that the final output of the semantic division network has the size of the original image.

The fourth layer (Level 4) uses the smallest amount of computation because the size of the feature information is the smallest. Therefore, in the fourth layer, the extended path is added to compensate for the ASPP sensitive to the high-frequency components, and the output was made insensitive to position change through the second ASPP using convolution having a wide kernel size.

In addition, the first ASPP includes an input stage that includes a CNN for receiving the feature information output from the second ASPP and a plurality of inverse DSCs (IDSCs) arranged in parallel with the CNN, and an output stage that combines each output value by the input stage and inputs the combined output value to the CNN. The size of the feature information of the third layer is larger than that of the fourth layer, and thus, the first ASPP, which is an ASPP with a wide FoV, is rearranged to refine the context once more.

Hereinafter, a result of testing an embodiment of the present invention will be described.

In order to check the performance of the embedded semantic division network apparatus 100 proposed in the embodiment of the present invention, the performance was compared by the Cityscapes validation set, which is the performance evaluation standard for the semantic division algorithm for vehicles. The semantic division network (MMANet) proposed in the present invention provides the highest recognition performance (73.1% mIoU) among the embedded deep learning algorithms as shown in Table 2 below.

TABLE 2

| Name | # Parameter (M) | # Multiplication (G) | FLOPS (G) | mIoU (%) | Processing Time (us) |
|---|---|---|---|---|---|
| CGNet | 0.5 | 3.8 | 7.6 | 63.5 | 7.6 |
| ContextNet | 0.8 | 6.6 | 13.1 | 65.9 | 2.3 |
| DABNet | 0.7 | 38.8 | 77.2 | 69.1 | 10.0 |
| EDANet | 0.7 | 33.2 | 66.8 | 65.1 | 6.2 |
| ERFNet | 2.0 | 103.9 | 208.7 | 71.5 | 9.8 |
| FastSCNN | 1.1 | 6.5 | 13.0 | 68.6 | 2.1 |
| ESPNet2 | 0.7 | 13.2 | 26.2 | 66.4 | 16.1 |
| MMANet (ours) | 4.6 | 6.3 | 12.5 | 73.1 | 6.7 |

The components of the present invention described above may be embodied as a program (or application) and stored in a medium for execution in combination with a computer which is hardware.

In order for the computer to read the program and execute the methods implemented as a program, the program may include code coded in a computer language such as C/C++, C #, JAVA, Python, machine language, and the like that the processor (central processing unit (CPU)) of the computer can read through a device interface of the computer. Such code may include functional code related to functions defining functions necessary for executing the methods, or the like, and include execution procedure related control code necessary for the processor of the computer to execute the functions according to a predetermined procedure. In addition, such code may further include memory reference related code for which a location (address, house number) of the internal or external memory where computer additional information or media necessary for the processor of the computer to execute the functions should be referenced. In addition, when the processor of the computer needs to communicate with any other computers, servers, or the like located remotely in order to execute the above functions, the code may further include communication-related code for how to communicate with any other computers, servers, or the like located remotely using a communication module of the computer, how to transmit/receive any information or media during communication, or the like.

The storage medium is not a medium that stores data therein for a short time, such as a register, a cache, a memory, or the like, but means a medium that semi-permanently stores data therein and is readable by a device. Specifically, examples of the storage medium include, but are not limited to, a read-only memory (ROM), a random-access memory (RAM), a compact disc (CD)-ROM, a magnetic tape, a floppy disk, an optical data storage device, and the like. That is, the program may be stored in various recording media on various servers accessible by the computer or in various recording media on the computer of the user. In addition, the media may be distributed in computer systems connected by a network, and store computer-readable code in a distributed manner.

According to an embodiment of the present invention described above, it is possible to provide a deep learning algorithm optimized for a matrix multiplication operator that is a hardware accelerator of TDA4V from TI Co., which is a vision processing unit (VPU) used in ADAS_VP and ADAS_PRK II controllers.

In particular, according to the present invention, a semantic segmentation network can classify each pixel of an image and divide locations and types of obstacles around a vehicle, thereby improving the performance of an autonomous driving system. In addition, according to an embodiment of the present invention, since it is possible to process six video graphics array (VGA)-level cameras at 20 FPS in real time, it is possible to provide higher recognition performance than the previously proposed method, thereby greatly improving the reliability of an autonomous driving system.

In addition, it is possible to provide a deep learning algorithm that provides high recognition performance only by using a simple hardware accelerator without using an expensive graphics processing unit (GPU), thereby reducing costs due to the use of the GPU.

Effects of the present invention are not limited to the above-described effects, and other effects that are not described will be clearly understood by those skilled in the art from the above descriptions.

It should be understood that the above description of the present invention is for illustrative purposes only, and those skilled in the art to which the present invention belongs can easily modify the disclosure into another specific form without changing the technical ideas or essential features of the present invention. Therefore, it should be understood that the above-described embodiments are illustrative in all aspects and not restrictive. For example, each component described as a single type may be implemented in a distributed manner, and similarly, components described as distributed may be implemented in a combined form.

It is to be understood that the scope of the present invention will be defined by the claims rather than the above-described description and all modifications and alterations derived from the claims and their equivalents are included in the scope of the present invention.

What is claimed is:

1. An embedded semantic division network apparatus embedded in a semantic division network and optimized for a matrix multiplication accelerator (MMA) that classifies pixels in vehicle images, the semantic division network including an encoder unit, a decoder unit, and a plurality of layers including upper and lower layers, the encoder and decoder units being provided throughout the plurality of layers, each of the encoder unit and decoder unit comprising at least one of a convolutional neural network (CNN) processing module and a depth-wise separable convolution (DSC) processing module that are configured to reduce some features of an image, the embedded semantic division network apparatus comprising:
   a processor; and
   a computer-readable medium in communication with the processor and storing instructions that, when executed by the processor, cause the processor to control the embedded semantic division network apparatus to perform:
      receiving an input image captured by a camera;
      selecting one of the CNN processing module and the DSC processing module based on a size of an activation map in each layer of the semantic division network; and
      extracting, using the selected one of the CNN processing module and the DSC processing module, a context of the input image.

2. The embedded semantic division network apparatus of claim 1, wherein, for extracting the context of the input image, the instructions, when executed by the processor, further cause the processor to control the embedded semantic division network apparatus to perform:
   receiving feature information of the image output from the encoder unit through extended Atrous spatial pyramid pooling (ASPP) applied to a predetermined layer of the decoder unit; and
   extracting the feature information corresponding to the encoded image.

3. The embedded semantic division network apparatus of claim 2, wherein the extended ASPP includes a plurality of ASPPs configured to extract a high-quality context using a reconstructed shape without global average pooling paths, the plurality of ASPPs including a first ASPP applied to the upper layer and a second ASPP applied to the lower layer.

4. The embedded semantic division network apparatus of claim 3, wherein the second ASPP is applied to a lowest one of the plurality of layers of the embedded semantic division network.

5. The embedded semantic division network apparatus of claim 3, wherein the second ASPP includes:
   an input stage including (1) a plurality of CNNs configured to receive the feature information from the encoder unit and (2) an extended path arranged in parallel with the plurality of CNNs, and an output stage configured to combine the feature information received by the input stage and input the combined feature information to the CNN.

6. The embedded semantic division network apparatus of claim 5, wherein the extended path includes:
the CNN;
a plurality of DSCs configured to receive an output of the CNN; and
a bilinear interpolation unit configured to combine a plurality of outputs from the DSCs and bilinearly interpolate the combined output.

7. The embedded semantic division network apparatus of claim 3, wherein the first ASPP includes:
an input stage including the CNN configured to receive the feature information from the second ASPP and a plurality of inverse DSCs (IDSCs) arranged in parallel with the CNN; and
an output stage configured to combine the feature information received by the input stage and to input the combined feature information to the CNN.

8. The embedded semantic division network apparatus of claim 1, wherein the encoder unit includes a shape information transfer unit including one or more CNNs provided in a predetermined one of the plurality of layers and configured to transmit, to the decoder unit, detailed shape information of the input image corresponding to each of the layers.

9. The embedded semantic division network apparatus of claim 1, wherein:
the plurality of layers includes first to fourth layers,
the encoder unit includes (1) two first modules provided in the third layer configured to abstract feature information from a previous layer and (2) a second module provided in the fourth layer,
each first module includes (1) a plurality of DSCs configured to receive the feature information and having different dilations, (2) a pointwise convolution unit configured to combine the feature information received by the plurality of DSCs, and (3) a first summer configured to sum the feature information received by the DSCs and the combined feature information from the pointwise convolution unit, and
the second module includes (1) a plurality of CNN layers configured to receive the feature information, and (2) a second summer configured to sum a plurality of outputs from the plurality of CNN layers and the feature information.

10. The embedded semantic division network apparatus of claim 1, wherein, in the embedded semantic division network, a maximum number of channels is limited to 64.

* * * * *